(12) United States Patent
Tezuka (10) Patent No.: US 11,381,695 B2
(45) Date of Patent: Jul. 5, 2022

(54) IMAGE READING APPARATUS

(71) Applicant: SEIKO EPSON CORPORATION, Tokyo (JP)

(72) Inventor: Seiji Tezuka, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 16/528,370

(22) Filed: Jul. 31, 2019

(65) Prior Publication Data

US 2020/0045194 A1 Feb. 6, 2020

(30) Foreign Application Priority Data

Jul. 31, 2018 (JP) .............................. JP2018-143269

(51) Int. Cl.

| B65H 29/70 | (2006.01) |
|---|---|
| B65H 29/12 | (2006.01) |
| B65H 29/52 | (2006.01) |
| H04N 1/00 | (2006.01) |
| B65H 5/36 | (2006.01) |
| B65H 5/06 | (2006.01) |
| B65H 27/00 | (2006.01) |

(52) U.S. Cl.
CPC .......... *H04N 1/00615* (2013.01); *B65H 5/06* (2013.01); *B65H 5/36* (2013.01); *H04N 1/00602* (2013.01); *B65H 27/00* (2013.01)

(58) Field of Classification Search
CPC ...... B65H 29/70; B65H 29/52; B65H 29/125; B65H 2511/13; B65H 2515/81; B65H 2301/5122; B65H 5/06; B65H 27/00; B65H 2403/51; H04N 1/00615; H04N 1/00602

See application file for complete search history.

(56) References Cited

U.S. PATENT DOCUMENTS

| 7,310,495 | B2 | 12/2007 | Nanori et al. | |
|---|---|---|---|---|
| 7,954,806 | B2 * | 6/2011 | Saito | ................. H04N 1/00567 271/65 |
| 8,864,131 | B2 | 10/2014 | Masanobu et al. | |

(Continued)

FOREIGN PATENT DOCUMENTS

| JP | 0388672 | | 4/1991 |
|---|---|---|---|
| JP | 2007039186 | A * | 2/2007 |

(Continued)

OTHER PUBLICATIONS

European Search Report issued in Application No. EP19189324 dated Dec. 3, 2019.

*Primary Examiner* — Luis A Gonzalez
(74) *Attorney, Agent, or Firm* — Workman Nydegger (57) ABSTRACT

A scanner includes a reading section configured to read a medium being transported, a discharge roller pair configured to nip the medium read in the reading section by a first roller and a second roller and discharge the medium, and a rib disposed in a position overlapping the discharge roller pair in a medium transport direction, the rib protruding from the first roller side toward the second roller side out of the first roller and the second roller, the rib including a first rib disposed on one side in a width direction intersecting the medium transport direction with respect to the discharge roller pair and a second rib disposed on the opposite side of the first rib in the width direction with respect to the discharge roller pair.

10 Claims, 11 Drawing Sheets

(56) References Cited

U.S. PATENT DOCUMENTS

| | | |
|---|---|---|
| 2012/0119431 A1 | 5/2012 | Kobayashi et al. |
| 2014/0054851 A1 | 2/2014 | Morikawa et al. |
| 2014/0078558 A1* | 3/2014 | Kanaya ............ H04N 1/00005 358/448 |
| 2015/0281492 A1 | 10/2015 | Mamura et al. |
| 2016/0297635 A1* | 10/2016 | Hongo .................... B65H 7/06 |

FOREIGN PATENT DOCUMENTS

| | | |
|---|---|---|
| JP | 2007176689 | 7/2007 |
| JP | 2007331845 A * | 12/2007 |
| JP | 2009-143696 | 7/2009 |
| JP | 2010047395 A * | 3/2010 |
| JP | 2011-043732 | 3/2011 |
| JP | 2015-189549 | 11/2015 |

\* cited by examiner

IMAGE READING APPARATUS

The present application is based on, and claims priority from JP Application Serial Number 2018-143269, filed Jul. 31, 2018, the disclosure of which is hereby incorporated by reference herein in its entirety.

BACKGROUND

1. Technical Field

The present disclosure relates to an image reading apparatus for reading an image.

2. Related Art

Some scanners, which are example image reading apparatuses, include an automatic document feeder, and are configured to automatically feed and read a plurality of documents. Such an automatic document feeder may be referred to as an ADF. The fed documents are read in a reading section disposed downstream in the transport direction of the automatic document feeder.

Such a scanner may include a discharge roller disposed downstream of the reading section to discharge documents to the outside of the apparatus and stack the documents in the discharged order. An example of the scanner having the above-described structure is disclosed in JP-A-2011-043732.

In some cases, a document discharged by a discharge roller may curl. In reading a plurality of documents in an image reading apparatus, if a preceding document is discharged in a curling state, problems such as jamming of subsequent documents or poor stacking of the discharged documents may occur, resulting in deterioration in stackability. In particular, such problems readily occur when documents are thin media having low rigidity or media having a fold and/or a crease.

JP-A-2011-043732 discloses a technique to reduce the discharging speed of the discharge roller to increase stackability. In some cases, however, it may be difficult to handle media that readily curl only by reducing the discharging speed.

SUMMARY

An image reading apparatus according to an aspect of the present disclosure for solving the above-described problems includes a reading section configured to read a medium being transported, a discharge roller pair configured to nip the medium read in the reading section by a first roller and a second roller and discharge the medium, and a rib disposed in a position overlapping the discharge roller pair in a medium transport direction, the rib protruding from one roller side toward the other roller side out of the first roller and the second roller, the rib including a first rib disposed on one side in a width direction intersecting the medium transport direction with respect to the discharge roller pair and a second rib disposed on the opposite side of the first rib in the width direction with respect to the discharge roller pair.

DESCRIPTION OF EXEMPLARY EMBODIMENTS

Hereinafter, an overview of the present disclosure will be described. An image reading apparatus according to a first aspect of the present disclosure includes a reading section configured to read a medium being transported, a discharge roller pair configured to nip the medium read in the reading section by a first roller and a second roller and discharge the medium, and a rib disposed in a position overlapping the discharge roller pair in a medium transport direction, the rib protruding from one roller side toward the other roller side out of the first roller and the second roller, the rib including a first rib disposed on one side in a width direction intersecting the medium transport direction with respect to the discharge roller pair and a second rib disposed on the opposite side of the first rib in the width direction with respect to the discharge roller pair.

According to this aspect, an image reading apparatus includes a reading section configured to read a medium being transported, a discharge roller pair configured to nip the medium read in the reading section by a first roller and a second roller and discharge the medium, and a rib disposed in a position overlapping the discharge roller pair in a medium transport direction, the rib protruding from one roller side toward the other roller side out of the first roller and the second roller, the rib including a first rib disposed on one side in a width direction intersecting the medium transport direction with respect to the discharge roller pair and a second rib disposed on the opposite side of the first rib in the width direction with respect to the discharge roller pair. Accordingly, in the medium to be discharged by the discharge roller pair, a wavy shape such as a convex shape or a concave shape may be formed in the width direction. The convex shape or the concave shape in the medium increases the rigidity of the medium. The medium to be discharged with the increased rigidity in the medium transport direction may reduce curling of the discharged medium and thereby the stackability may be increased.

In the image reading apparatus according to a second aspect, in the first aspect, the discharge roller pair may include a first discharge roller pair and a second discharge roller pair disposed with a space in the width direction with respect to the first discharge roller pair, in which the first rib and the second rib may be disposed such that the first discharge roller pair and the second discharge roller pair are sandwiched therebetween.

According to this aspect, the discharge roller pair may include a first discharge roller pair and a second discharge roller pair disposed with a space in the width direction with respect to the first discharge roller pair, and thus a medium may be stably discharged. Furthermore, the first rib and the second rib may be disposed such that the first discharge roller pair and the second discharge roller pair are sandwiched therebetween, and thus a functional effect similar to the above-described aspect may be achieved.

The image reading apparatus according to a third aspect, in the second aspect, may include a third rib disposed between the first discharge roller pair and the second discharge roller pair and protrudes in a direction opposite to the protruding direction of the first rib and the second rib.

According to this aspect, the discharge roller pair may include a third rib disposed between the first discharge roller pair and the second discharge roller pair and protrudes in a direction opposite to the protruding direction of the first rib and the second rib. Consequently, in the medium to be discharged by the discharge roller pair, a convex shape or a concave shape may be further effectively formed in the width direction.

In the image reading apparatus according to a fourth aspect, in any one of the first aspect to the third aspect, the first rib and the second rib may be disposed in any one of a rotation shaft of the first roller and a rotation shaft of the second roller.

According to this aspect, the first rib and the second rib may be disposed in any one of a rotation shaft of the first roller and a rotation shaft of the second roller, and thus the ribs may be disposed in a simple and space-saving manner.

In the image reading apparatus according to a fifth aspect, in any one of the first to the fourth aspect, the first rib and the second rib may be configured to be positioned in a first state or in a second state further retracted from a medium transport path than the first state.

According to this aspect, the first rib and the second rib may be configured to be positioned in a first state or in a second state further retracted from a medium transport path than the first state, and thus the amount of curve of a convex shape or a concave shape to be formed in the medium may be changed or it may be selected not to form a convex shape or a concave shape in the medium.

The image reading apparatus according to a sixth aspect, in the fifth aspect, may include a controller configured to control the positioning of the first rib and the second rib, and the controller may control the first rib and the second rib in accordance with a rigidity of the medium.

According to this aspect, the controller may control the first rib and the second rib in accordance with a rigidity of the medium. Consequently, for example, when a medium that has a low rigidity and would curl is to be discharged, the first rib and the second rib may be set to the first state to form a convex shape or a concave shape for providing the medium a rigidity, and thus the stackability of the medium having the low rigidity may be increased. On the other hand, a medium that has a high rigidity is less likely to curl. Furthermore, when a medium having a high rigidity is brought into contact with the ribs, the medium may be damaged. To discharge a medium having a high rigidity and less likely to curl, the first rib and the second rib may be set to the second state to prevent the first rib and the second rib from coming into contact with the medium.

The image reading apparatus according to a seventh aspect, in the sixth aspect, may include a medium detection section disposed upstream of the reading section, the medium detection section including a transmitter that transmits ultrasonic waves and a receiver that receives the ultrasonic waves transmitted from the transmitter and outputs an output value corresponding to the received ultrasonic waves, and the controller may control the first rib and the second rib in accordance with a result of detection by the medium detection section.

According to this aspect, the controller may control the first rib and the second rib in accordance with a result of detection by the medium detection section, and thus the first rib and the second rib may be automatically controlled.

In the image reading apparatus according to an eighth aspect, in the sixth aspect or the seventh aspect, the controller may control the first rib and the second rib in accordance with a result read by a reading section.

According to this aspect, the controller may control the first rib and the second rib in accordance with a result read by a reading section, and thus the first rib and the second rib may be automatically controlled.

First Embodiment

An image reading apparatus according to the first embodiment of the present disclosure will be described with reference to the accompanying drawings. In this embodiment, as an example image reading apparatus, a document scanner 1 (hereinafter, simply referred to as a scanner 1) that can read an image on at least one of the front surface and the back surface of a medium will be described.

In an X-Y-Z coordinate system in the drawings, an X direction denotes an apparatus width direction and a medium width direction, and a Y direction denotes a medium transport direction. A Z direction intersects the Y direction and is approximately orthogonal to a surface of a medium to be transported. A +Y direction denotes the front of the apparatus, and a −Y direction side denotes the back of the apparatus. When viewed from the front of the apparatus, a left side denotes a +X direction, and a right side denotes a −X direction. A +Z direction denotes an apparatus upper side, and a −Z direction side denotes an apparatus lower side. A direction toward which a medium is fed, that is, the +Y direction denotes "downstream" and the opposite direction, that is, the −Y direction denotes "upstream".

Overview of Scanner

Hereinafter, the scanner 1 according to the embodiment of the present disclosure will be described with reference to FIG. 1 and FIG. 2. The scanner 1 illustrated in FIG. 1 has a casing 2 that includes in it a reading section 20 (FIG. 2) for reading an image on a transported medium P. The casing 2 includes a lower unit 3 and an upper unit 4. The upper unit 4 is openably and closably attached to the lower unit 3 so as to be rotated about its downstream side in the medium transport direction with respect to the lower unit 3. The upper unit 4 can be rotated and opened toward the apparatus front side such that a medium transport path 10 (FIG. 2) for a medium P is exposed for a user to readily fix a jam of the medium P.

Figure 1:
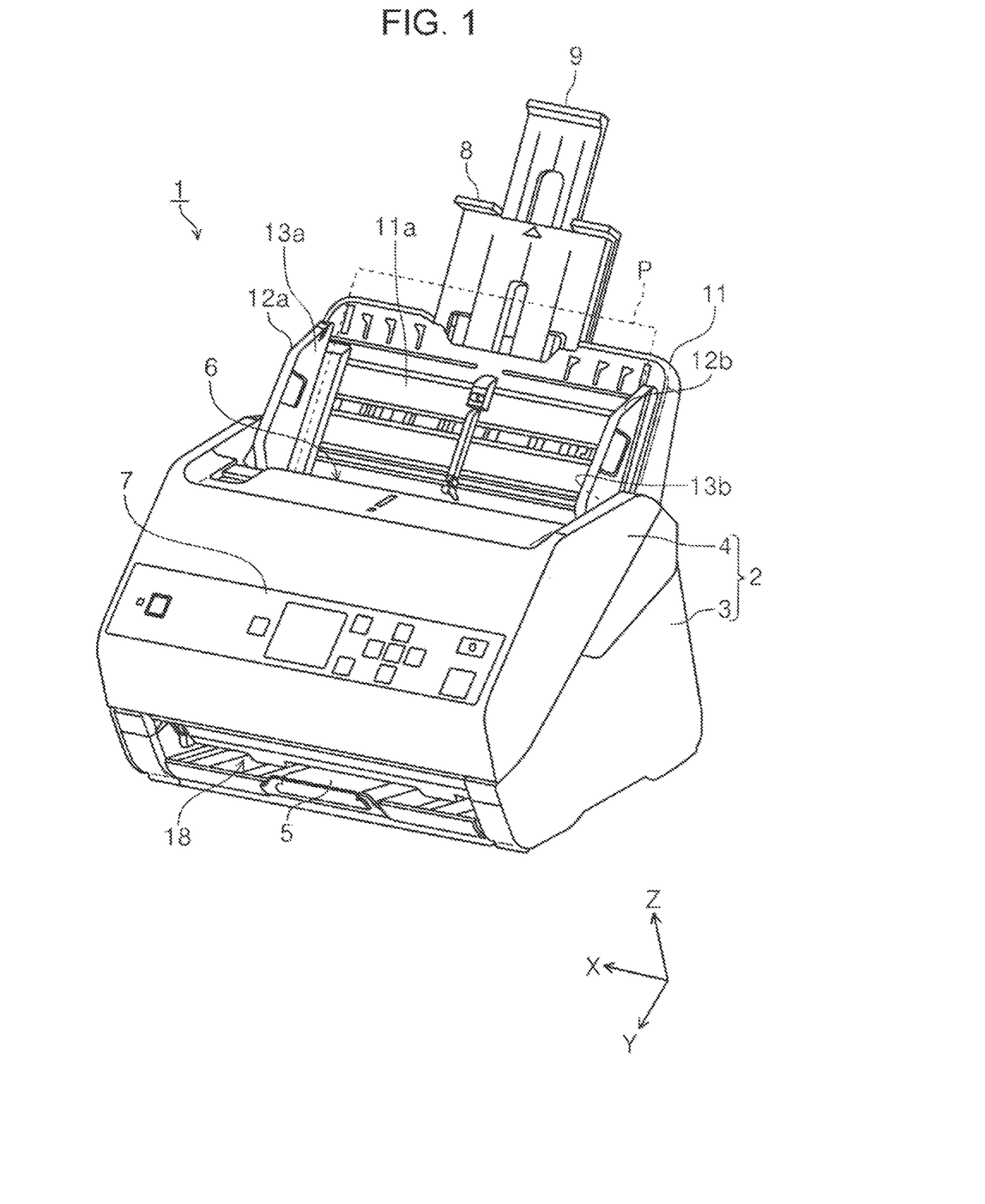
FIG. 1 is an external perspective view of a scanner according to a first embodiment.

In FIG. 1, in the −Y direction, which denotes the rear of the casing 2, a medium mounting section 11 on which a medium P is mounted, and a first edge guide 12*b* and a second edge guide 12*a* that guide edges of the medium P are provided. The first edge guide 12*b* and the second edge guide 12*a* respectively have a guide surface 13*b* and a guide surface 13*a* for guiding edges along the width direction (X axis) of a medium P set on a mounting surface 11*a* of the medium mounting section 11. The first edge guide 12*b* and the second edge guide 12*a* are disposed slidably along the X axis to be adjusted to the size of a medium P. In this embodiment, the first edge guide 12b and the second edge guide 12a are configured such that one of the edge guides is moved and the other edge guide moves in the opposite direction to follow the X-movement of the one edge guide by a known rack and pinion mechanism. For example, when the first edge guide 12b is moved in the −X direction from the state in FIG. 1, the second edge guide 12a moves in the +X direction. By the movement, a medium P mounted on the medium mounting section 11 is aligned at the center in the width direction.

Figure 2:
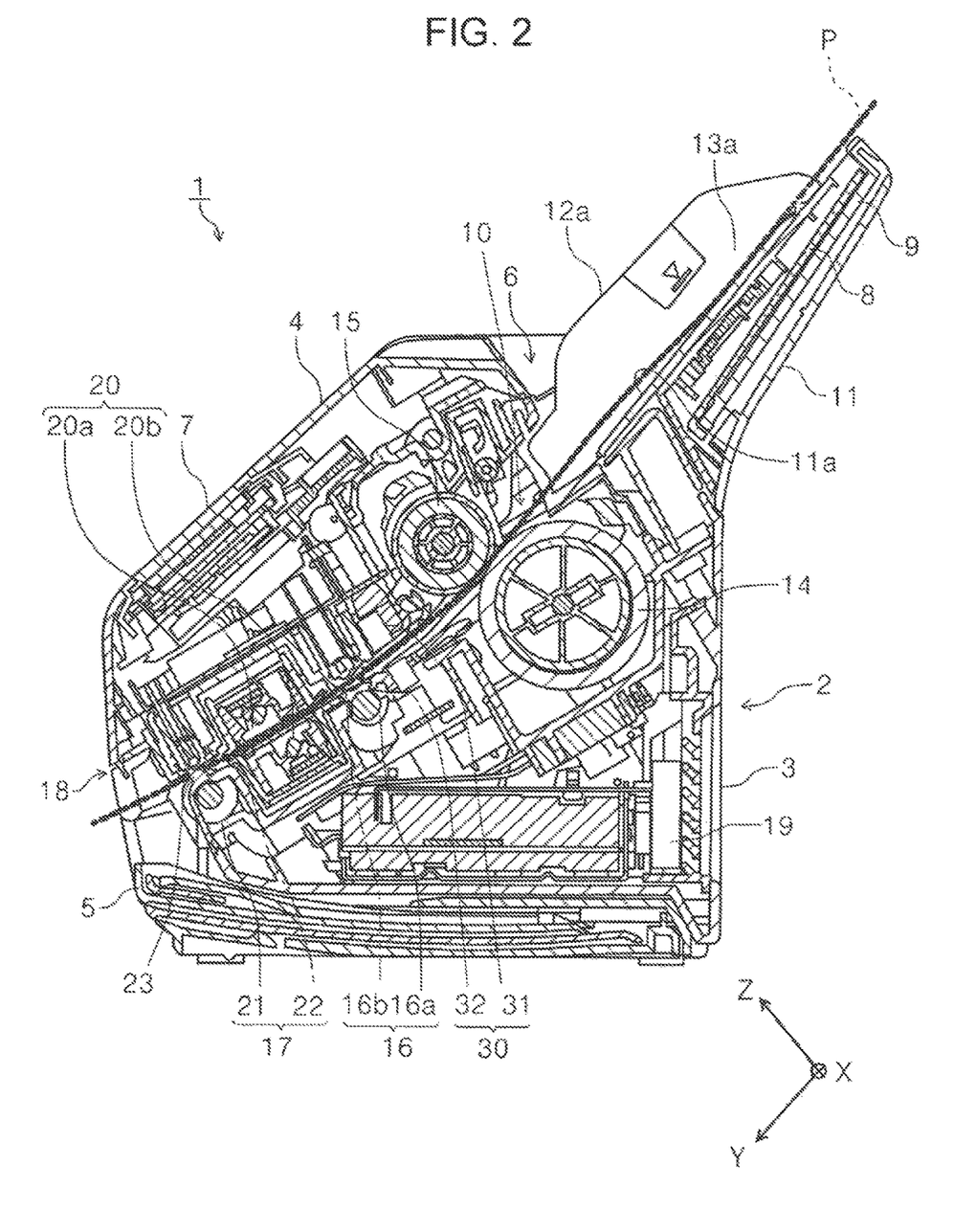
FIG. 2 is a side cross-sectional view of a medium transport path in a scanner according to the first embodiment.

The medium mounting section 11 in FIG. 1 and FIG. 2 is provided with a first auxiliary paper support 8 and a second auxiliary paper support 9. The first auxiliary paper support 8 and the second auxiliary paper support 9 can be stored inside the medium mounting section 11 as illustrated in FIG. 2, and can be pulled out from the medium mounting section 11 as illustrated in FIG. 1 such that the length of the mounting surface 11a can be adjusted.

The casing 2 illustrated in FIG. 1 has an operation panel 7 on the apparatus front of the upper unit 4. The operation panel 7 is used by a user to set various settings for reading or to execute a reading operation, or is used to display reading setting contents, or the like. A feed port 6 that is connected to the inside of the casing 2 is disposed in an upper portion of the upper unit 4. A medium P mounted on the medium mounting section 11 is fed from the feed port 6 toward the reading section 20 (FIG. 2). A discharge tray 5, which will be described below, is disposed on the apparatus front side of the lower unit 3.

Medium Transport Path in Scanner

Next, a medium transport path 10 in the scanner 1 will be described mainly with reference to FIG. 2. The dotted line P in FIG. 2 indicates a medium P that is transported along the medium transport path 10. A feeding roller 14 for feeding a medium P mounted on the mounting surface 11a of the medium mounting section 11 toward the reading section 20 and a separation roller 15 for nipping the medium P with the feeding roller 14 and separating the medium P are disposed downstream of the medium mounting section 11.

A medium P mounted on the medium mounting section 11 is picked up by the feeding roller 14 that can be rotated with respect to the lower unit 3 when the feeding roller 14 is rotated while being in contact with the surface of the medium P facing the mounting surface 11a. In the upper unit 4, the separation roller 15 is disposed so as to face the feeding roller 14. A sheet of medium P is nipped and separated by the feeding roller 14 and the separation roller 15 and fed downstream (+Y direction). The feeding roller 14 and the separation roller 15 are disposed in a central area in the width direction (X-axis direction), and a medium P is fed by a center-feeding method.

A transport roller pair 16, the reading section 20 for reading images, and a discharge roller pair 17 are disposed downstream of the feeding roller 14. A medium P fed downstream of the feeding roller 14 is nipped by the transport roller pairs 16 and transported to the reading section 20 that is disposed downstream of the transport roller pairs 16. The transport roller pair 16 includes a transport driving roller 16a and a transport driven roller 16b.

A medium detection section 30 is disposed in the medium transport path 10 between the feeding roller 14 and the reading section 20. The medium detection section 30 includes a transmitter 31 that transmit ultrasonic waves and a receiver 32 that receives the ultrasonic waves transmitted from the transmitter 31 and outputs an output value that corresponds to the received ultrasonic waves. The transmitter 31 and the receiver 32 are disposed on the upper side and the lower side across the transport path respectively. More specifically, the transmitter 31 is disposed in the upper unit 4 and the receiver 32 is disposed in the lower unit 3. In this embodiment, based on an output value output from the receiver 32 in the medium detection section 30, detection of multi-sheet feeding of media P or a medium P having a fold, a crease, or the like, or detection of the thickness of a medium P can be performed.

The reading section 20 includes an upper read sensor 20a that is disposed in the upper unit 4 and a lower read sensor 20b that is disposed in the lower unit 3. In this embodiment, as an example, the upper read sensor 20a and the lower read sensor 20b are configured as a contact image sensor (CIS) module (CISM).

After an image on at least one of the front side and the back side of a medium P has been read in the reading section 20, the medium P is nipped by the discharge roller pair 17 that is disposed downstream of the reading section 20 and sent downstream, and discharged from a discharge port 18 that is provided on the apparatus front of the casing 2. The discharge roller pair 17 includes a first roller 21 that is a driving roller and a second roller 22 that nips a medium P with the first roller 21. The second roller 22 is a driven roller that is driven to rotate by the first roller 21.

Figure 4:
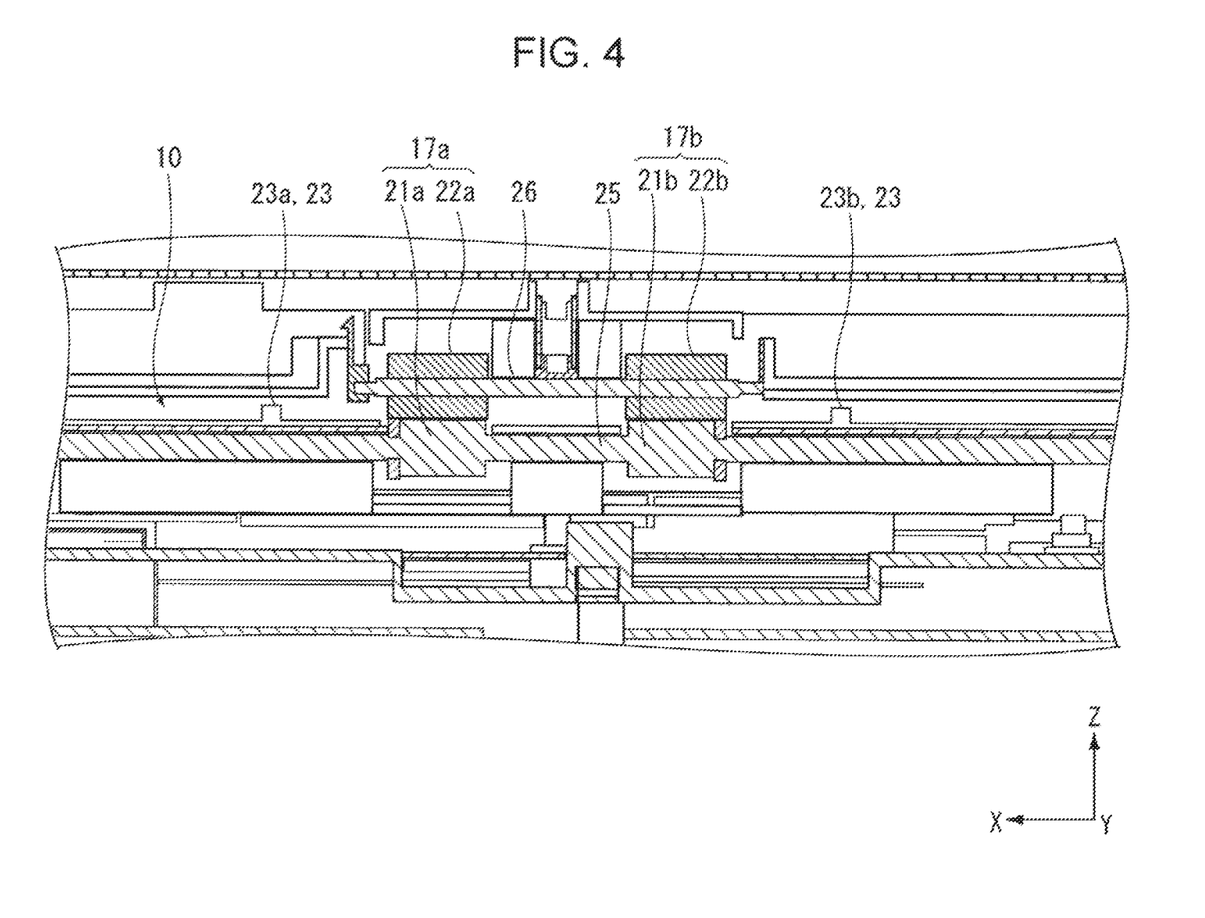
FIG. 4 is a cross-sectional view taken along the line IV-IV in FIG. 3.

In this embodiment, two discharge roller pairs 17 are disposed along the X axis, which is the width direction, as illustrated in FIG. 4. More specifically, the discharge roller pair 17 includes a first discharge roller pair 17a and a second discharge roller pair 17b that is disposed with a space with respect to the first discharge roller pair 17a in the width direction. In this embodiment, the first discharge roller pair 17a is disposed on the +X direction side with respect to the center in the width direction, and the second discharge roller pair 17b is disposed on the −X side with respect to the center in the width direction. The first discharge roller pair 17a includes a first roller 21a and a second roller 22a. The second discharge roller pair 17b includes a first roller 21b and a second roller 22b. In FIG. 4, a first rotation shaft 25 is a rotation shaft of the first rollers 21a and 21b. A second rotation shaft 26 is a rotation shaft of the second rollers 22a and 22b. With this structure, a medium P is transported by the two roller pairs disposed with a space in the width direction, and thus enabling stable discharge of the medium P. In addition to the discharge roller pairs 17, two feeding rollers 14 and two transport roller pairs 16 may be provided with a space in the width direction respectively.

In this embodiment, the feeding roller 14, the transport driving roller 16a, and the first roller 21 are driven to rotate by at least one drive source (not illustrated) disposed in the lower unit 3. The separation roller 15 may be driven to rotate in a reverse rotation direction opposite to the rotation direction for feeding a medium P, that is, in a counterclockwise direction as viewed from the front in FIG. 2, by the drive source (not illustrated). The drive source is controlled by a controller 19 illustrated in FIG. 2, and thereby the transport of a medium P by the rollers is controlled.

In the lower unit 3, the discharge tray 5 that can be pulled toward the front of the apparatus from the discharge port 18 is provided. The discharge tray 5 may be stored in a bottom part of the lower unit 3 (FIG. 1) or may be pulled toward the front of the apparatus (not illustrated). While the discharge tray 5 is being pulled out, media P discharged from the discharge port 18 can be stacked on the discharge tray 5.

As illustrated in FIG. 2, a rib 23 is disposed at a position overlapping the discharge roller pair 17 in the Y-axis direction, which is the medium transport direction. The rib 23 that is a feature of the present disclosure will be described in detail below.

Rib

Figure 3:
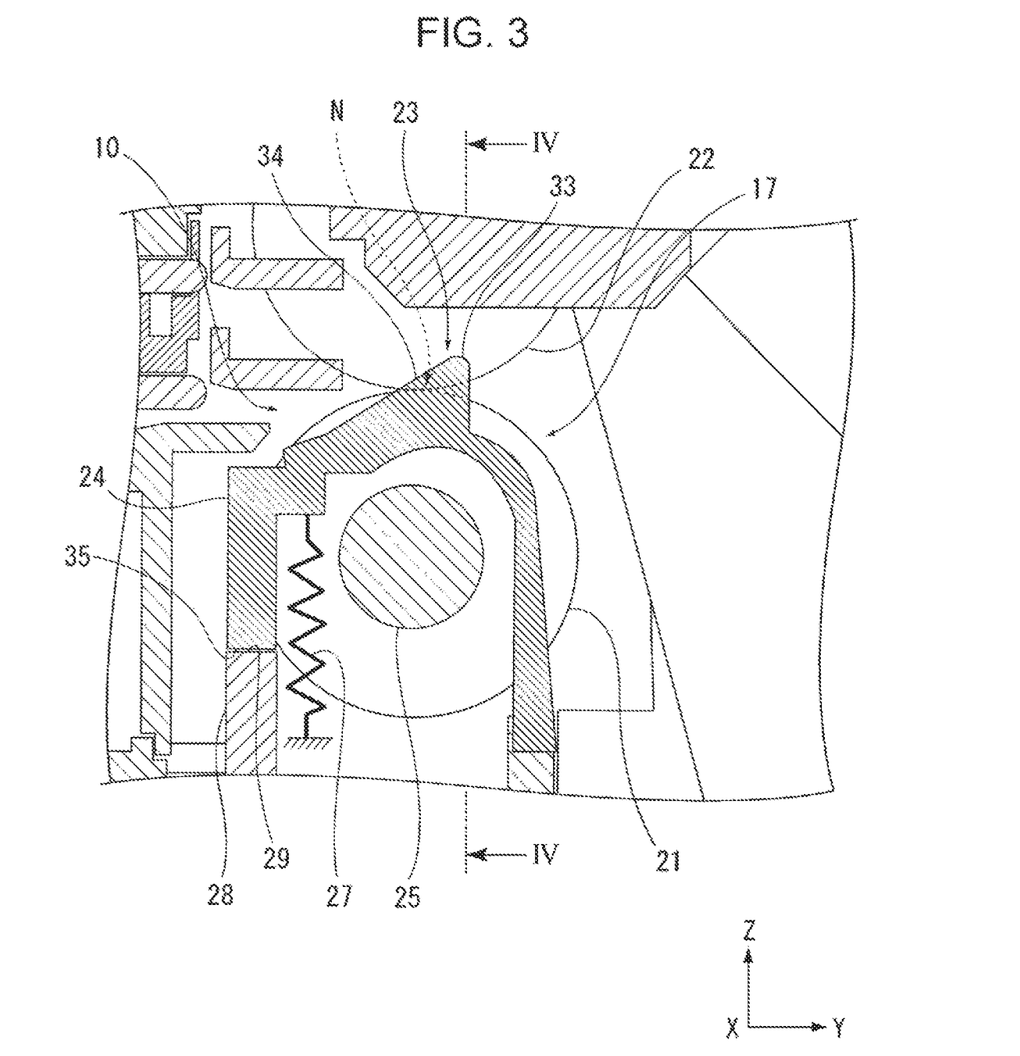
FIG. 3 is a schematic side cross-sectional view of a discharge roller pair and the vicinity of the discharge roller pair.

With reference to FIG. 3 to FIG. 6, the rib 23 will be described. As illustrated in FIG. 3, the rib 23 is disposed in a position overlapping the discharge roller pair 17 in the Y-axis direction, which is the medium transport direction. In the first roller 21 and the second roller 22, the rib 23 according to the embodiment protrudes from the first roller 21 side toward the second roller 22 side. Specifically, the rib 23 protrudes from the lower side toward the upper side. The rib 23 includes a slope 34 rising from the upstream toward a top portion 33 located at a highest position. The top portion 33 is located downstream of a nipping position N between the first roller 21 and the second roller 22 in the medium transport direction.

As illustrated in FIG. 4, the rib 23 includes a first rib 23a and a second rib 23b. The first rib 23a is located on the +X direction side, which is one side in the width direction intersecting the medium transport direction with respect to the first discharge roller pair 17a and the second discharge roller pair 17b serving as the discharge roller pair 17. The second rib 23b is located on the −X direction side opposite to the first rib 23a in the width direction with respect to the discharge roller pair 17 (the first discharge roller pair 17a and the second discharge roller pair 17b). Accordingly, the first rib 23a and the second rib 23b are disposed to sandwich the first discharge roller pair 17a and the second discharge roller pair 17b.

The medium P that is a document to be read by the scanner 1 may be, for example, a thin sheet such as a receipt or a sheet having a fold and/or a crease made by being folded or the like. In some cases, when such a medium P is discharged by the discharge roller pair 17, the leading edge or the trailing edge of the medium may curl. The curling leading edge or the curling trailing edge of the medium may cause a preceding medium P that has been discharged onto the discharge tray 5 to come in contact with the subsequent medium P and may be jammed at the discharge port 18, or the media P may be stacked on the discharge tray 5 in a poorly aligned manner, resulting in lower stackability.

Figure 5:
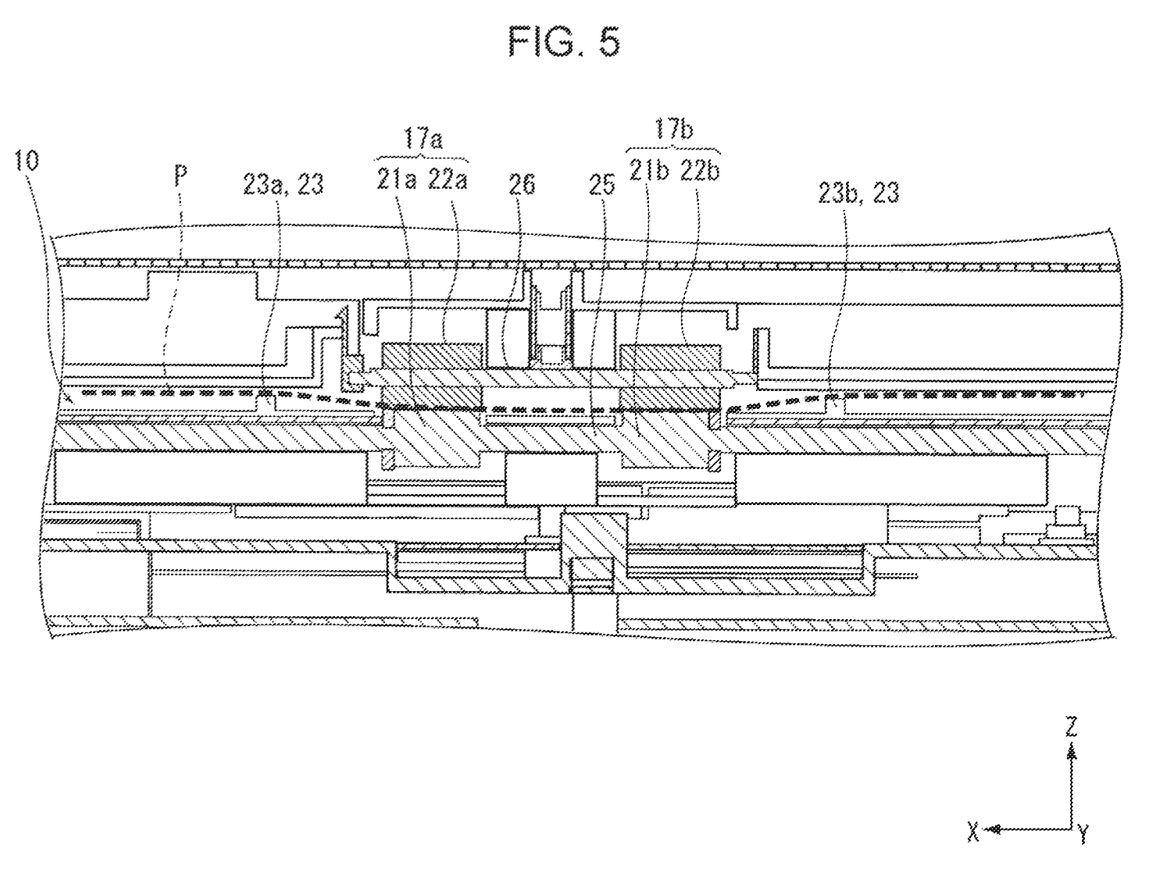
FIG. 5 illustrates an orientation of a medium discharged by a discharge roller pair.

In this embodiment, the first rib 23a and the second rib 23b are disposed on the respective sides of the first discharge roller pair 17a and the second discharge roller pair 17b in the width direction, and as illustrated in FIG. 5, a medium P discharged by the first discharge roller pair 17a and the second discharge roller pair 17b can be curved in a concave shape having a lower central portion and higher end portions in the width direction. A medium P curved in a concave shape in the width direction provides increased rigidity in the medium P and reduces paper curling in the medium transport direction. Consequently, curling in a leading edge portion or a trailing edge portion of a medium P can be reduced and the stackability of media P stacked on the discharge tray 5 can be increased.

Figure 6:
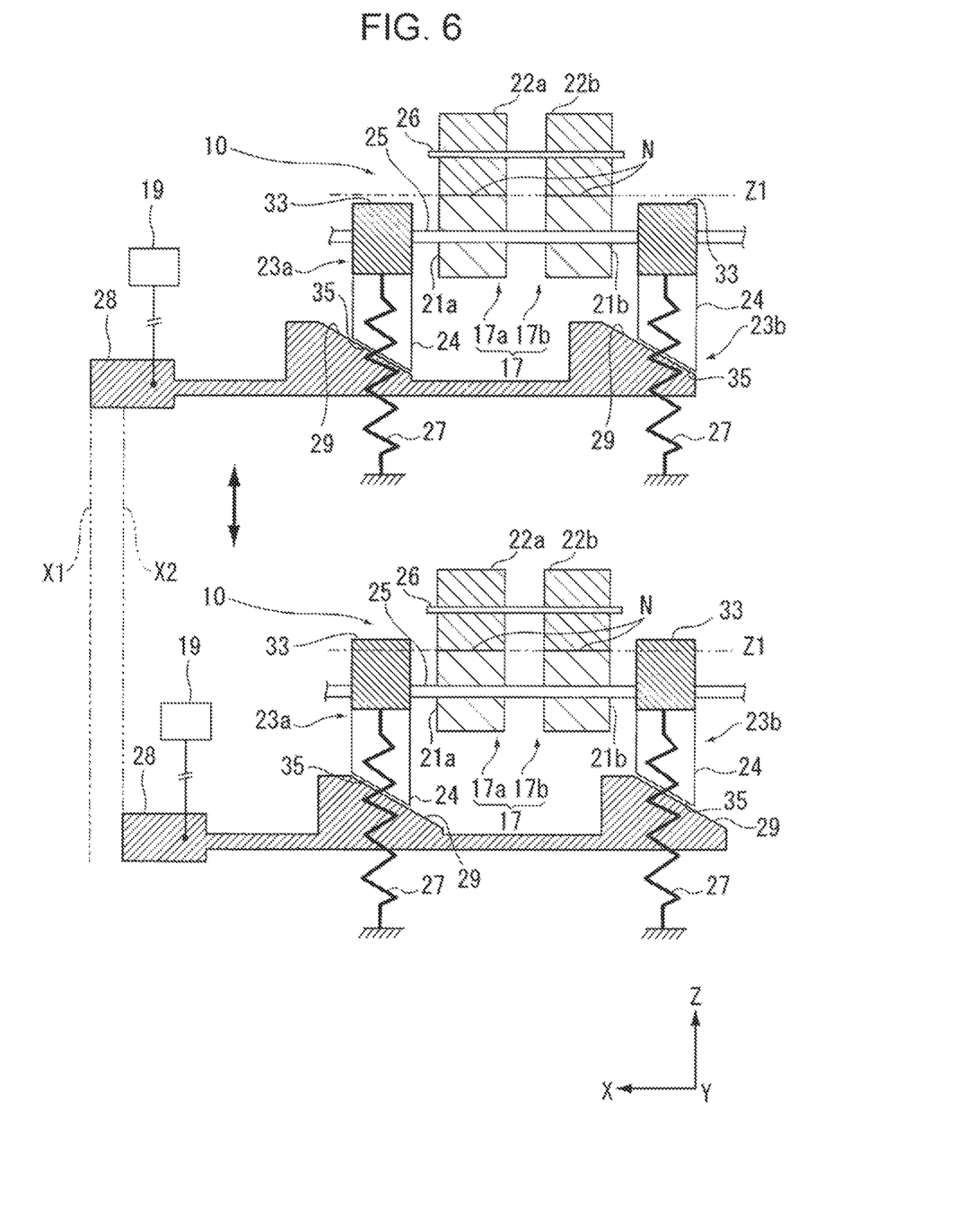
FIG. 6 illustrates a positioning section.

For example, a state in which the first rib 23a and the second rib 23b are in a state illustrated in lower views in FIG. 3 and FIG. 6 is defined as a first state, and a state in which the first rib 23a and the second rib 23b are retracted from the medium transport path 10 further than the first state as illustrated in an upper view in FIG. 6 is defined as a second state, and then, the first rib 23a and the second rib 23b can be switched between the first state and the second state. With this structure, as described above, whether to curve a medium P in the concave shape for providing the medium P an increased rigidity or to directly discharge the medium P without curving the medium P in the concave shape can be selected. The switching of the first rib 23a and the second rib 23b between the first state and the second state is controlled by the controller 19. In the description below, first a positioning section 28 for switching the first rib 23a and the second rib 23b between the first state and the second state will be described and then the control by the controller 19 will be described.

Positioning Section

The positioning section 28 in the upper view and the lower view in FIG. 6 is configured to be slidable to advance or retract along the X axis, which is the width direction. The positioning section 28 can be moved along the X axis by an operation of an electromagnetic clutch (not illustrated) or the like, and the operation is controlled by the controller 19.

As illustrated in FIG. 3, the first rib 23a and the second rib 23b, which serve as the rib 23, are provided in an upper portion of a base section 24. Returning to the upper view and the lower view in FIG. 6, the positioning section 28 includes contact portions 29 and the contact portions 29 come into contact with contact portions 35 that are provided in a lower portion of the base section 24. The contact portions 29 and the contact portions 35 have inclined surfaces that are inclined downward in the −X direction respectively. Specifically, when the upper view and the lower views in FIG. 6 are viewed from the front, the contact portions 29 are tapered in the −X direction. The base section 24 including the first rib 23a and the second rib 23b is pulled downward (−Z direction) by tension springs 27.

In the upper view in FIG. 6 illustrating the first rib 23a and the second rib 23b in the second state, an end portion of the positioning section 28 on the +X side is in a position X1. In this position, the contact portions 35 are supported by the tapered portions of the contact portions 29 on the −X side, and the positions of the top portions 33 of the first rib 23a and the second rib 23b are lower than nipping positions N of the first roller 21 and the second roller 22 in the height direction. An alternate long and short dashed line Z1 denotes a position of the nipping positions N in the height direction.

To switch the first rib 23a and the second rib 23b to the first state in the lower view in FIG. 6, the positioning section 28 is slid in the −X direction. In the lower view in FIG. 6, an end portion of the positioning section 28 on the +X side is in a position X2. When the positioning section 28 is slid in the −X direction, the base sections 24 are moved upward along the inclined surfaces of the contact portions 29. Consequently, the first rib 23a and the second rib 23b are also moved upward and are switched to the first state in which the positions of the top portions 33 are higher than the position Z1 of the nipping positions N in the height direction. Note that the base sections 24 are moved upward against the tension of the tension springs 27.

To return the first rib 23a and the second rib 23b from the first state to the second state, the positioning section 28 is slid in the +X direction until the end portion of the positioning section 28 in the +X direction is positioned to the position X1 illustrated in the upper view in FIG. 6. The base sections 24 are quickly returned by the tension of the tension springs 27 to the position illustrated in the upper view in FIG. 6. The positioning section 28 may be stopped in any position between the position X1 and the position X2, in addition to the position X1 and the position X2. Consequently, the amount of protrusion of the first rib 23a and the second rib 23b toward the medium transport path 10 may be changed to a predetermined amount.

Control by Controller

Now, a control operation to be performed by the controller 19 will be described. The controller 19 according to the embodiment controls positioning of the first rib 23a and the second rib 23b in accordance with the rigidity of a medium P. For example, when a medium P that has a low rigidity and can curl is discharged, a concave shape or a convex shape for providing the medium P a rigidity in the transport direction may be formed in the medium P. Accordingly, when a document is a medium P having a low rigidity or a medium P having a fold and/or a crease, the first rib 23a and the second rib 23b are set to the first state (lower view in FIG. 6), that is, the rib 23 is protruded toward the medium transport path 10, to form a concave shape for providing the medium P a rigidity. As a result, the stackability of the medium P can be increased.

On the other hand, a medium P that has a high rigidity is less likely to curl. Furthermore, when a medium P having a high rigidity is brought into contact with the first rib 23a and the second rib 23b, the medium P may be damaged. Accordingly, when a document is a medium P having a high rigidity, the first rib 23a and the second rib 23b are set to the second state (upper view in FIG. 6) to prevent the first rib 23a and the second rib 23b from coming into contact with the medium P. Whether to set the first rib 23a and the second rib 23b to the first state or the second state may be, for example, selected by the controller 19 depending on the type of medium P set by a user via a scanner driver, or may be controlled by the controller 19 by controlling the first rib 23a and the second rib 23b based on a detection result of the medium detection section 30 as will be described next.

Control Operation Based on Detection Result by Medium Detection Section

In FIG. 2, as described above, the medium detection section 30, which is disposed upstream of the reading section 20, based on an output value output from the receiver 32, performs detection of multi-sheet feeding of transported media P, detection of a medium P having a fold, a crease, or the like, or detection of the thickness of a medium P. When a sheet of medium P is normally transported, ultrasonic waves are blocked by the medium P passing between the transmitter 31 and the receiver 32, and the ultrasonic waves received by the receiver 32 are attenuated more than the ultrasonic waves received by the receiver 32 when no medium P is transported. Accordingly, an output value T1 at the time of transporting the medium P (one sheet) is lower than an output value T0 at the time no medium P is transported. Consequently, when the output value T from the receiver 32 is within a predetermined reference range, it can be determined that the medium P is a sheet of medium P being normally transported.

When two sheets of media P are being transported in an overlapped state, that is, in a multi-fed state, ultrasonic waves received by the receiver 32 are attenuated more than when one sheet of medium P is being transported. Accordingly, an output value T2 at the time of multi-sheet feeding further decreases than the output value T1 at the time one sheet of medium P is transported.

When the output value T1 is set to plain paper, in a case of thick paper that is thicker than the plain paper, ultrasonic waves received by the receiver 32 are attenuated more than when the medium P is one sheet of plain paper. Accordingly, an output value T3 output to one sheet of thick paper further decreases than the output value T1 at the time one sheet of plain paper is transported.

Furthermore, ultrasonic waves emitted from the transmitter 31 readily passes through thin paper thinner than plain paper, and thus ultrasonic waves received by the receiver 32 increase more than when plain paper is transmitted. Accordingly, an output value T4 output to the thin paper is higher than the output value T1. Furthermore, when a medium P has a fold and/or a crease, the output value tends to increase.

Consequently, when an output value T output as a result of detection by the medium detection section 30 is equal to or greater than a predetermined value, it can be determined that the medium P is thin paper or a medium having a fold and/or a crease, and when the output value T is less than the predetermined value, it can be determined that the medium P is plain paper or thick paper. The controller 19 according to the embodiment sets the first rib 23a and the second rib 23b to the first state when an output value T is equal to or greater than a predetermined value and sets the first rib 23a and the second rib 23b to the second state when the output value T is less than the predetermined value. With this operation, the switching of the first rib 23a and the second rib 23b between the first state and the second state can be automatically performed.

Figure 7:
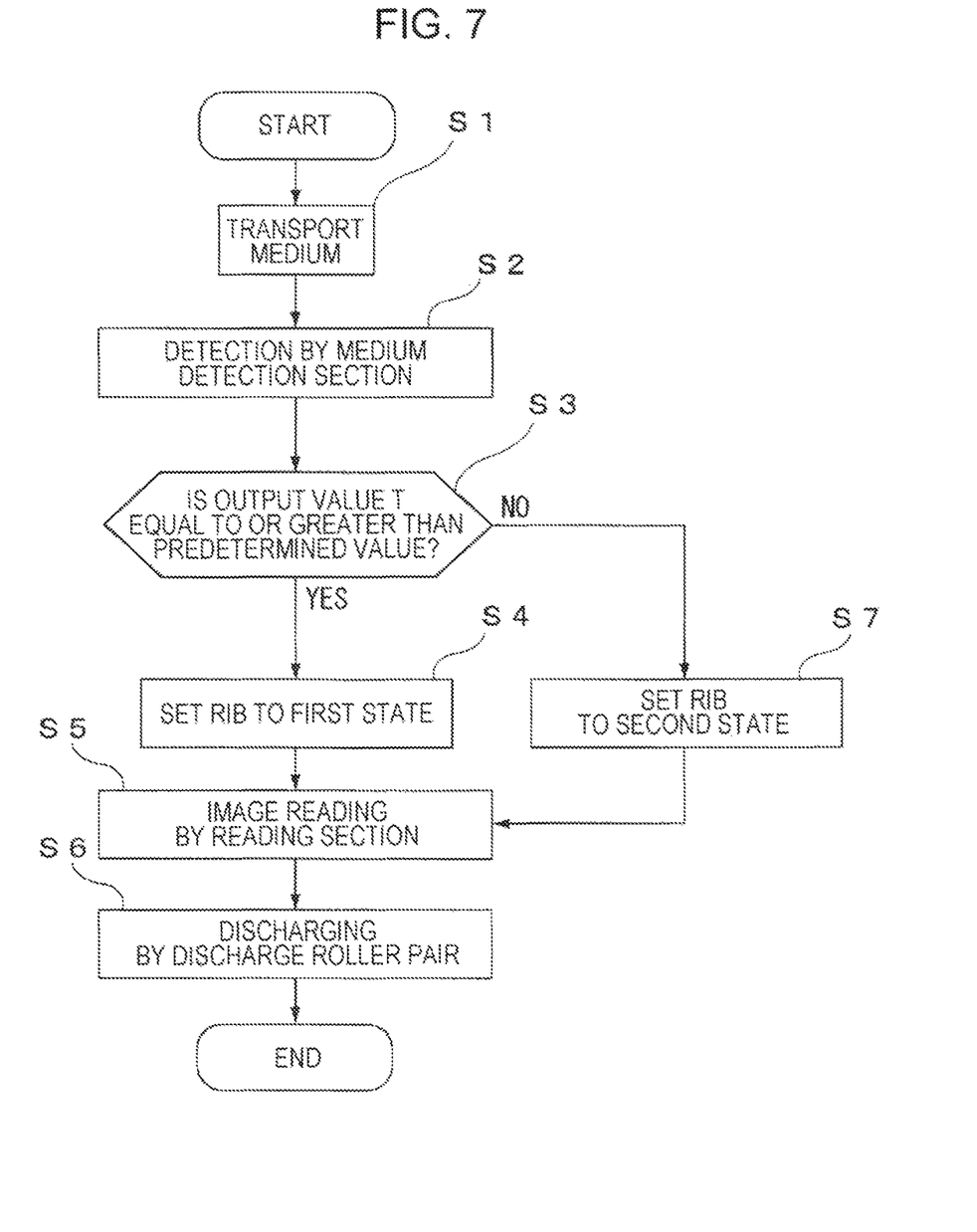
FIG. 7 is a flowchart illustrating a control operation to be performed based on a result of detection by a medium detection section.

With reference to a flowchart in FIG. 7, a flow of the control operation performed by the controller 19 based on a result of detection by the medium detection section 30 will be described. When scanning is started, transport of a medium P is started in step S1. In step S2, the medium P is detected by the medium detection section 30. In step S3, whether an output value T as a result of the detection by the medium detection section 30 is equal to or greater than a predetermined value is determined.

If YES in step S3, the medium P is a medium that readily curls such as thin paper, and then, in step S4, the first rib 23a and the second rib 23b (rib 23) are set to the first state in which the first rib 23a and the second rib 23b are protruded toward the medium transport path 10. On the other hand, if NO in step S3, the medium P is plain paper or thick paper, and then, in step S7, the first rib 23a and the second rib 23b (rib 23) are set to the second state in which the first rib 23a and the second rib 23b are retracted from the medium transport path 10.

After the execution of step S4 or step S7, in step S5, image reading of the medium P is performed by the reading section 20. In step S6, the medium P is discharged by the discharge roller pair 17. The operation in step S4 or step S7 is performed before the discharging (step S6) is performed by the discharge roller pair 17, and the operation may be performed simultaneously with the image reading of the medium P by the reading section 20 (step S5).

Control Operation Based on Result of Reading by Reading Section

The controller 19 can control the first rib 23a and the second rib 23b based on a result of reading by the reading section 20. If a thin medium P has images on both sides, an offset may occur in an image read by the reading section 20. Consequently, when a result of reading by the reading section 20 includes an offset, it can be determined that the medium P being transported is thin paper or a medium having a crease or the like.

Figure 8:
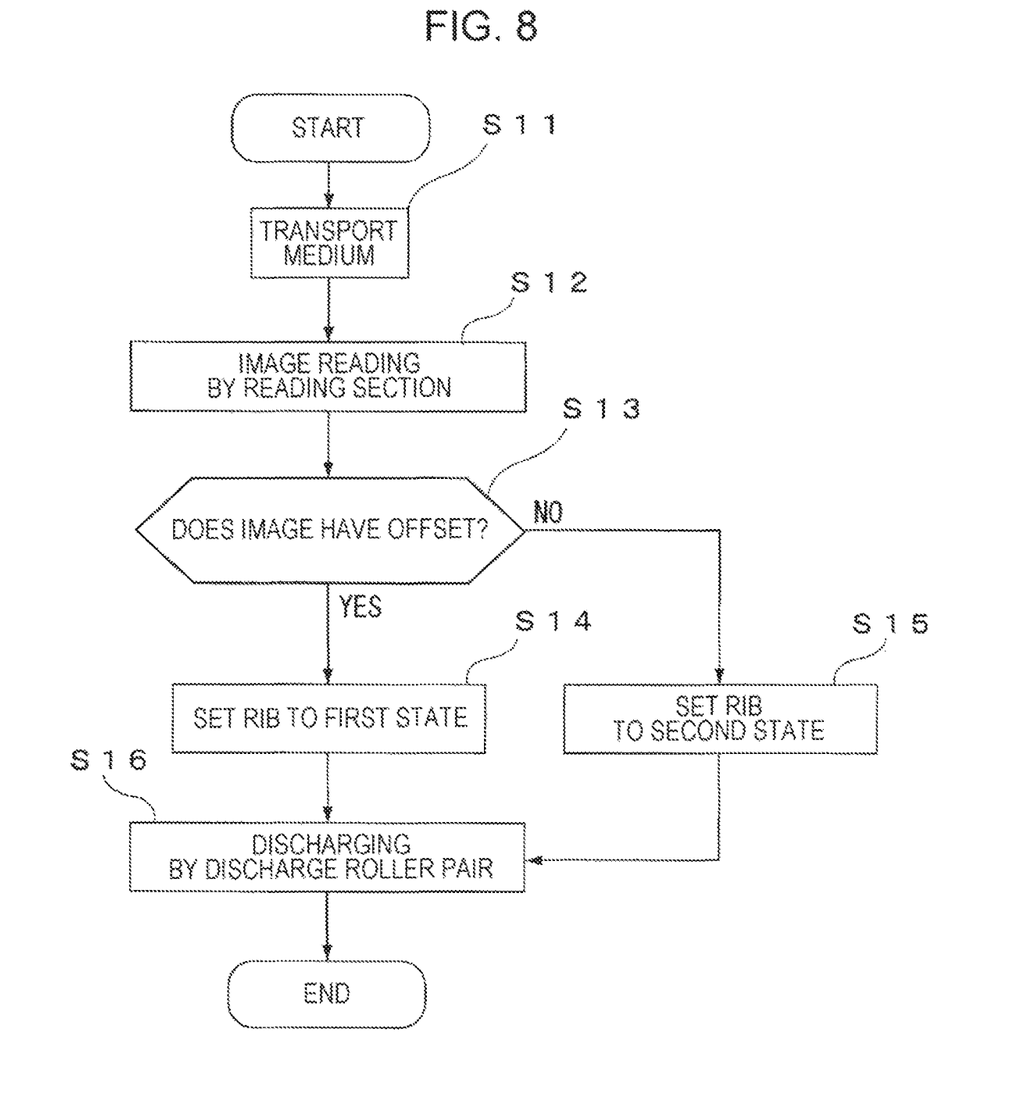
FIG. 8 is a flowchart illustrating a control operation to be performed based on a result of reading by a reading section.

With reference to a flowchart in FIG. 8, a flow of the control operation to be performed by the controller 19 based on a result of reading by the reading section 20 will be described. When scanning is started, transport of a medium P is started in step S11. When the medium P is transported to the reading section 20, in step S12, image reading of the medium P is performed by the reading section 20.

In step S13, whether the image read in step S12 has an offset is determined. If YES in step S13, that is, if the image has an offset, the medium P is a medium that readily curls such as thin paper, and then, in step S14, the first rib 23a and the second rib 23b (rib 23) are set to the first state in which the first rib 23a and the second rib 23b are protruded toward the medium transport path 10. On the other hand, if NO in step S13, the medium P is a thick medium such as plain paper or thick paper, and then, in step S15, the first rib 23a and the second rib 23b (rib 23) are set to the second state in which the first rib 23a and the second rib 23b are retracted from the medium transport path 10. After the execution of step S14 or step S15, in step S16, the medium P is discharged by the discharge roller pair 17.

With this operation, the switching of the first rib 23a and the second rib 23b between the first state and the second state can be automatically performed based on a result of reading by the reading section 20. Note that, when a medium P has a fold or a crease, a shadow of the fold or crease may appear in a read image.

Other Structures of Rib

The space between the first rib 23a and the second rib 23b may be set, for example, to a space wider than a width corresponding to a passport. Specifically, the first rib 23a and the second rib 23b may be disposed outside the width corresponding to the passport. A passport, a driver's license, an insurance card, or the like may be scanned by using the scanner 1. A notebook type medium such as a passport and a card type medium such as a driver's license or an insurance card have high rigidity, and thus curling of the media hardly occurs at the time of discharging.

In the structure in which the first rib 23a and the second rib 23b are disposed outside the width corresponding to a passport, a medium of the passport size or a medium smaller than the passport size passes between the first rib 23a and the second rib 23b, and the provision of the rigidity to the small medium by the first rib 23a and the second rib 23b can be prevented. In addition to the discharge roller pair 17 according to the embodiment having two roller pairs of the first discharge roller pair 17a and the second discharge roller pair 17b, a structure having one discharge roller pair 17 in a central area or a structure having three or more roller pairs aligned in the width direction may be employed. In addition to the structure in which the positions of the first rib 23a and the second rib 23b are switched between the first state and the second state, the first rib 23a and the second rib 23b may be fixed in the first state in which first rib 23a and the second rib 23b protrude toward the medium transport path 10.

Second Embodiment

Figure 9:
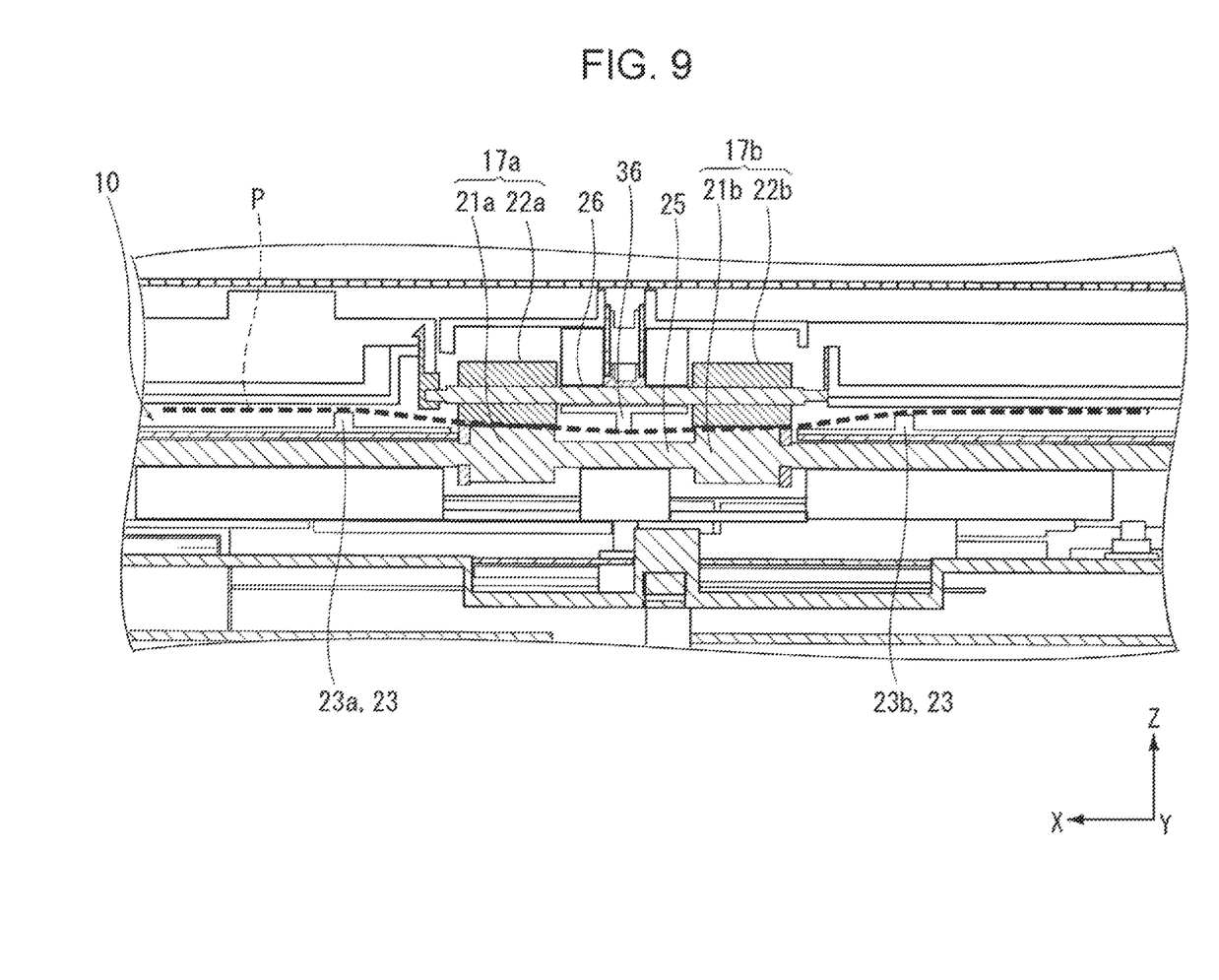
FIG. 9 illustrates a rib according to a second embodiment.

With reference to FIG. 9, another example of the rib will be described. In this embodiment, to components similar to those in the first embodiment, the same reference numerals are given, and descriptions of the components are omitted. As illustrated in FIG. 9, between the first discharge roller pair 17a and the second discharge roller pair 17b, a third rib 36 that protrudes in a direction opposite to the +Z direction which is the projecting direction of the first rib 23a and the second rib 23b, that is, the −Z direction, may be disposed.

With the third rib 36 disposed between the first discharge roller pair 17a and the second discharge roller pair 17b, as illustrated in FIG. 9, the third rib 36 presses a central portion of a medium P from above, and thus the medium P can be more effectively curved in the concave shape with respect to the width direction of the medium P being discharged.

Modifications of Rib

Figure 10:
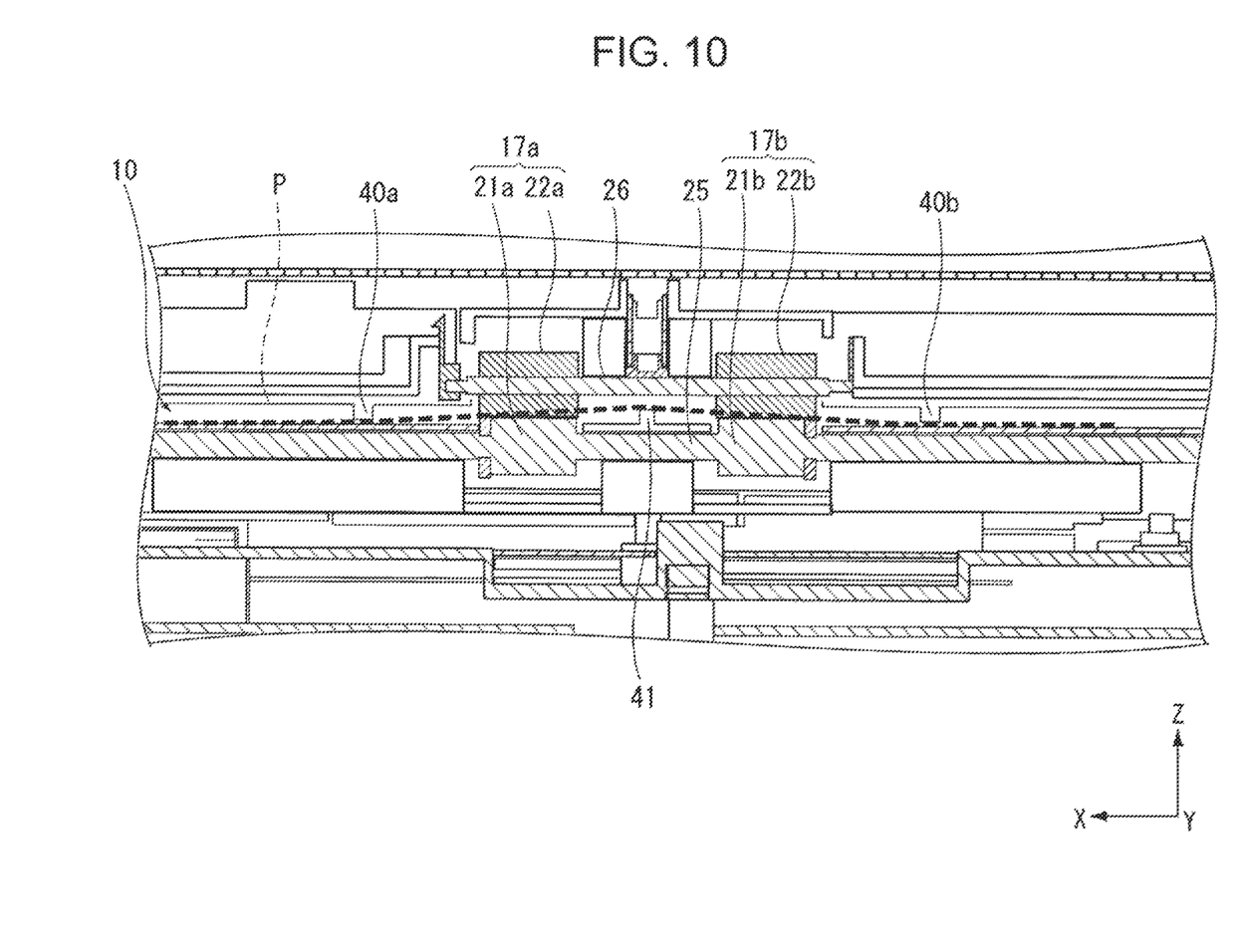
FIG. 10 illustrates a modification of the second embodiment.

The rib 23 can be protruded from the second roller 22 side toward the first roller 21 side in the direction opposite to the direction in the first embodiment or the second embodiment. For example, as in FIG. 10, a first rib 40a and a second rib 40b, which are provided on sides of the first discharge roller pair 17a and the second discharge roller pair 17b respectively, may be protruded from above toward the medium transport path 10, and a third rib 41, which is provided between the first discharge roller pair 17a and the second discharge roller pair 17b, may be protruded from below toward the medium transport path 10. With this structure of the first rib 40a, the second rib 40b, and the third rib 41, a central portion of the medium P in the width direction becomes high and the medium P can be curved in a convex shape having lower end portions. By the convex shape, the medium P can be provided with a rigidity, and thus the stackability of the discharged medium P can be increased.

Third Embodiment

Figure 11:
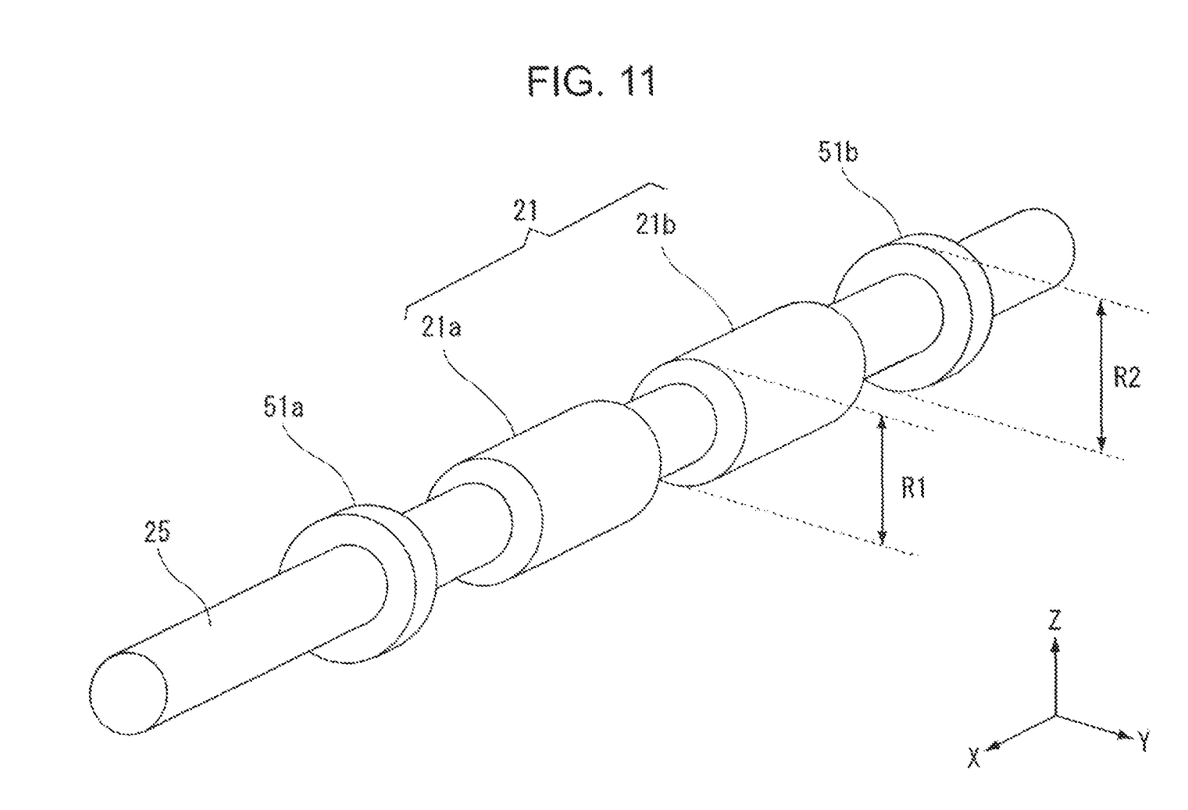
FIG. 11 illustrates a rib according to a third embodiment.

With reference to FIG. 11, still another example of the rib will be described. In this embodiment, a first rib 51a and a second rib 51b are disposed on the first rotation shaft 25 that is the rotation shaft of the first roller 21. More specifically, the first rib 51a and the second rib 51b are disposed coaxially with the first roller 21, that is, have a disk shape disposed on the first rotation shaft 25. The first rib 51a is disposed on the +X direction side respect to the first roller 21a, and the second rib 51b is disposed on the −X direction side respect to the first roller 21b. Accordingly, the first rib 51a and the second rib 51b are disposed to sandwich the first roller 21a and the first roller 21b. The first rib 51a and the second rib 51b have a diameter R2 that is larger than a diameter R1 of the first roller 21.

The larger diameter R2 of the first rib 51a and the second rib 51b than the diameter R1 of the first roller 21 allows the first rib 51a and the second rib 51b to protrude from the first roller 21 side toward the second roller 22 side similarly to the structure according to the first embodiment in FIG. 4, while the first roller 21 and the second roller 22 are nipping a medium P. This structure in which the first rib 51a and the second rib 51b are disposed on the first rotation shaft 25 of the first roller 21 allows the first rib 51a and the second rib 51b to be disposed in the simple and space-saving manner.

Although not illustrated, the rotation shaft 26 of the second roller 22a and the second roller 22b in FIG. 4 may be provided with a disk-shaped third rib having a diameter larger than the diameter of the second roller 22a and the second roller 22b. In such a case, the structure is similar to the structure according to the second embodiment in FIG. 9. Alternatively, the first rib and the second rib may be disposed on the second rotation shaft 26 and the third rib may be disposed on the first rotation shaft, and thereby a structure similar to the modification of the second embodiment in FIG. 10 may be provided.

It is to be understood that the present disclosure is not limited to the embodiments, various modifications can be made within the scope of the following claims, and these modifications are included within the scope of the present disclosure.

What is claimed is:

1. An image reading apparatus comprising:
   a reading section configured to read a medium being transported in a first direction;
   a first discharge roller pair configured to nip the medium read in the reading section by a first roller and a second roller and discharge the medium;
   a second discharge roller pair configured to nip the medium read in the reading section by a third roller and a fourth roller and discharge the medium, the second discharge roller pair being disposed with respect to the first discharge roller pair with a space in a width direction intersecting a medium transport direction;

a first rib disposed on one side in the width direction and protrudes from the first roller side toward the second roller side in a second direction, the first rib being configured to form a convex shape or a concave shape in the medium read in the reading section; and a second rib disposed on the opposite side of the first rib in the width direction and protrudes from the third roller side toward the fourth roller side, the second rib being configured to form a convex shape or a concave shape in the medium read in the reading section, wherein in a side view of the image reading apparatus, the first rib is disposed at a position overlapping the first discharge roller pair, and in the side view of the image reading apparatus, the second rib is disposed at a position overlapping the second discharge roller pair, wherein the first rib and the second rib are operationally coupled together by a positioning section configured to translate in a direction orthogonal to the first direction and the second direction.

2. The image reading apparatus according to claim 1, wherein the first rib has a first top portion at a top in the protruding direction, the second rib has a second top portion at a top in the protruding direction, the first top portion is configured to be positioned in a first position higher than a first nipping position of the first discharge roller pair in the protruding direction of the first rib, and the second top portion is configured to be positioned in a second position higher than a second nipping position of the second discharge roller pair in the protruding direction of the second rib.

3. The image reading apparatus according to claim 2, wherein the first rib is configured to be positioned in a position between the first position and a third position that is retracted from the medium transport path and away from the medium being transported, and the second rib is configured to be positioned in a position between the second position and a fourth position that is retracted from the medium transport path and away from the medium being transported.

4. The image reading apparatus according to claim 3, further comprising:

a controller configured to control the positioning of the first rib and the second rib, wherein the controller controls the positioning of the first rib and the second rib in accordance with a rigidity of the medium.

5. The image reading apparatus according to claim 4, further comprising:

a medium detection section disposed upstream of the reading section, the medium detection section including a transmitter that transmits ultrasonic waves and a receiver that receives the ultrasonic waves transmitted from the transmitter and outputs an output value corresponding to the received ultrasonic waves, wherein the controller controls the first rib and the second rib in accordance with a result of detection by the medium detection section.

6. The image reading apparatus according to claim 4, wherein the controller controls the first rib and the second rib in accordance with a result read by the reading section.

7. The image reading apparatus according to claim 1, wherein the first discharge roller pair and the second discharge roller pair are disposed between the first rib and the second rib.

8. The image reading apparatus according to claim 7, further comprising:

a third rib disposed between the first discharge roller pair and the second discharge roller pair and protrudes in a direction opposite to the protruding direction of the first rib and the second rib.

9. An image reading apparatus comprising:

a reading section configured to read a medium being transported in a first direction;

a discharge roller pair configured to nip the medium read in the reading section by a first roller and a second roller and discharge the medium;

a first rib disposed on one side in a width direction intersecting a medium transport direction with respect to the discharge roller pair and protrudes from a first roller side toward a second roller side in a second direction, the first rib being configured to form a convex shape or a concave shape in the medium read in the reading section; and a second rib disposed on the opposite side of the first rib in the width direction with respect to the discharge roller pair and protrudes from the first roller side toward the second roller side, the second rib being configured to form a convex shape or a concave shape in the medium read in the reading section, wherein in a side view of the image reading apparatus, the first rib and the second rib are disposed at positions overlapping the discharge roller pair, and the first rib and the second rib are operationally coupled together by a positioning section configured to translate in a direction orthogonal to the first direction and the second direction.

10. The image reading apparatus according to claim 9, wherein the first rib has a first top portion at a top in the protruding direction, the second rib has a second top portion at a top in the protruding direction, the first top portion is configured to be positioned in a first position higher than a nipping position of the discharge roller pair in the protruding direction of the first rib, and the second top portion is configured to be positioned in a second position higher than the nipping position of the discharge roller pair in the protruding direction of the second rib.

* * * * *